(12) United States Patent
Chandra et al.

(10) Patent No.: US 8,160,049 B2
(45) Date of Patent: Apr. 17, 2012

(54) METHOD AND APPARATUS FOR DYNAMICALLY CONFIGURING A HYBRID AUTOMATIC REPEAT REQUEST MEMORY

(75) Inventors: Arty Chandra, Manhasset Hills, NY (US); Guodong Zhang, Farmingdale, NY (US); John S. Chen, Downingtown, PA (US); Mohammed Sammour, Montreal (CA); Stephen E. Terry, Northport, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 351 days.

(21) Appl. No.: 11/670,639

(22) Filed: Feb. 2, 2007

(65) Prior Publication Data

US 2007/0189206 A1      Aug. 16, 2007

Related U.S. Application Data

(60) Provisional application No. 60/843,145, filed on Sep. 8, 2006, provisional application No. 60/764,842, filed on Feb. 3, 2006.

(51) Int. Cl.
*H04J 3/24*       (2006.01)
(52) U.S. Cl. ........ 370/349; 370/230; 370/231; 370/235; 370/236; 455/418; 455/419; 455/420
(58) Field of Classification Search .......... 455/418–420; 370/236, 328, 349, 230–231, 235
See application file for complete search history.

(56) References Cited

U.S. PATENT DOCUMENTS

| | | | |
|---|---|---|---|
| 6,557,134 B2 * | 4/2003 | Bims et al. ..................... | 714/748 |
| 6,658,005 B2 * | 12/2003 | Seidel et al. .................. | 370/394 |
| 6,700,867 B2 * | 3/2004 | Classon et al. ................ | 370/216 |
| 6,801,512 B1 * | 10/2004 | Cudak et al. .................. | 370/332 |
| 7,103,729 B2 * | 9/2006 | Altahan et al. ................ | 711/154 |
| 7,155,655 B2 * | 12/2006 | Cheng .......................... | 714/748 |
| 7,376,426 B2 * | 5/2008 | Nakamata et al. ............ | 455/442 |
| 7,447,516 B2 * | 11/2008 | Heo et al. ...................... | 455/522 |
| 2003/0161280 A1 | 8/2003 | Gruhn et al. | |

(Continued)

FOREIGN PATENT DOCUMENTS

| | | |
|---|---|---|
| EP | 1 341 336 | 9/2003 |
| EP | 1389847 A1 | 2/2004 |
| JP | 2005-536159 A | 11/2005 |
| WO | 2004/015906 | 2/2004 |
| WO | WO 2004/019543 A1 | 3/2004 |
| WO | 2005/029789 | 3/2005 |

*Primary Examiner* — Jinsong Hu
*Assistant Examiner* — Qun Shen
(74) *Attorney, Agent, or Firm* — Condo Roccia LLP

(57) ABSTRACT

A method and apparatus for dynamically configuring a memory for hybrid automatic repeat request (H-ARQ) processes in a receiving node to permit a more flexible H-ARQ memory configuration and improve the performance of H-ARQ processes. An H-ARQ memory in the receiving node is reserved for a plurality of H-ARQ processes. A transmitting node dynamically configures the H-ARQ memory in the receiving node for each H-ARQ transmission so that the memory requirement for a plurality of H-ARQ processes exceeds the H-ARQ memory capacity. If there is insufficient H-ARQ memory available to support H-ARQ transmissions, only a subset of the plurality of H-ARQ processes may be activated at a time. When there is insufficient H-ARQ memory for processing H-ARQ transmissions, a negative acknowledgement (NACK), an acknowledgement (ACK), nothing, and/or information indicating the reason for a failed transmission may be transmitted to a transmitting node.

20 Claims, 2 Drawing Sheets

U.S. PATENT DOCUMENTS

| | | | |
|---|---|---|---|
| 2004/0037224 A1* | 2/2004 | Choi et al. | 370/235 |
| 2004/0114593 A1* | 6/2004 | Dick et al. | 370/389 |
| 2005/0094878 A1* | 5/2005 | Becker | 382/205 |
| 2006/0007880 A1* | 1/2006 | Terry | 370/328 |
| 2006/0092960 A1* | 5/2006 | Lee et al. | 370/412 |
| 2006/0092973 A1* | 5/2006 | Petrovic et al. | 370/469 |

* cited by examiner

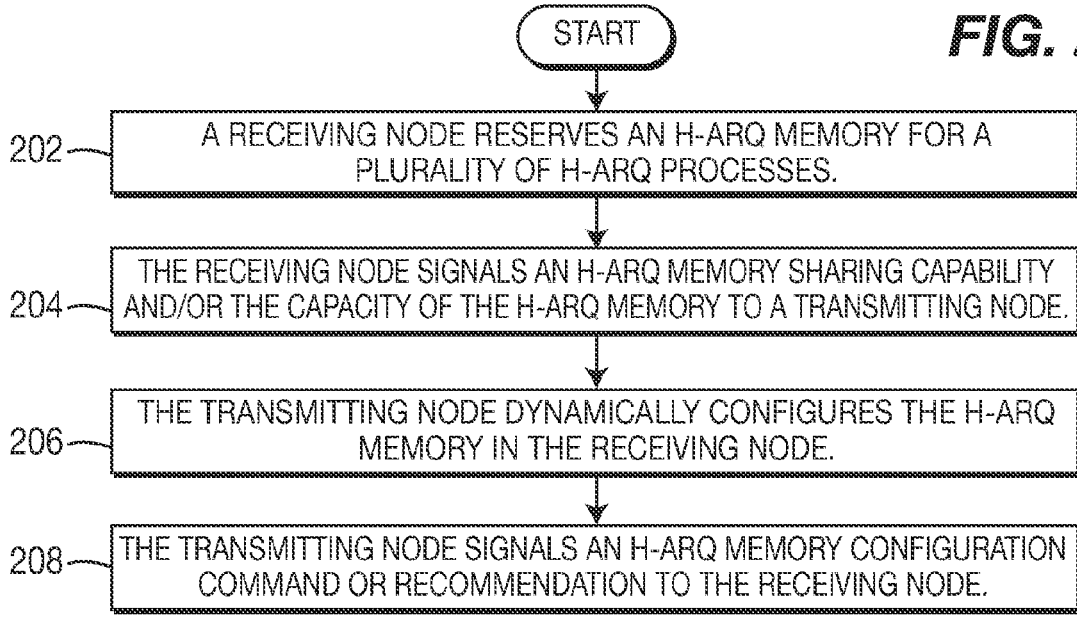
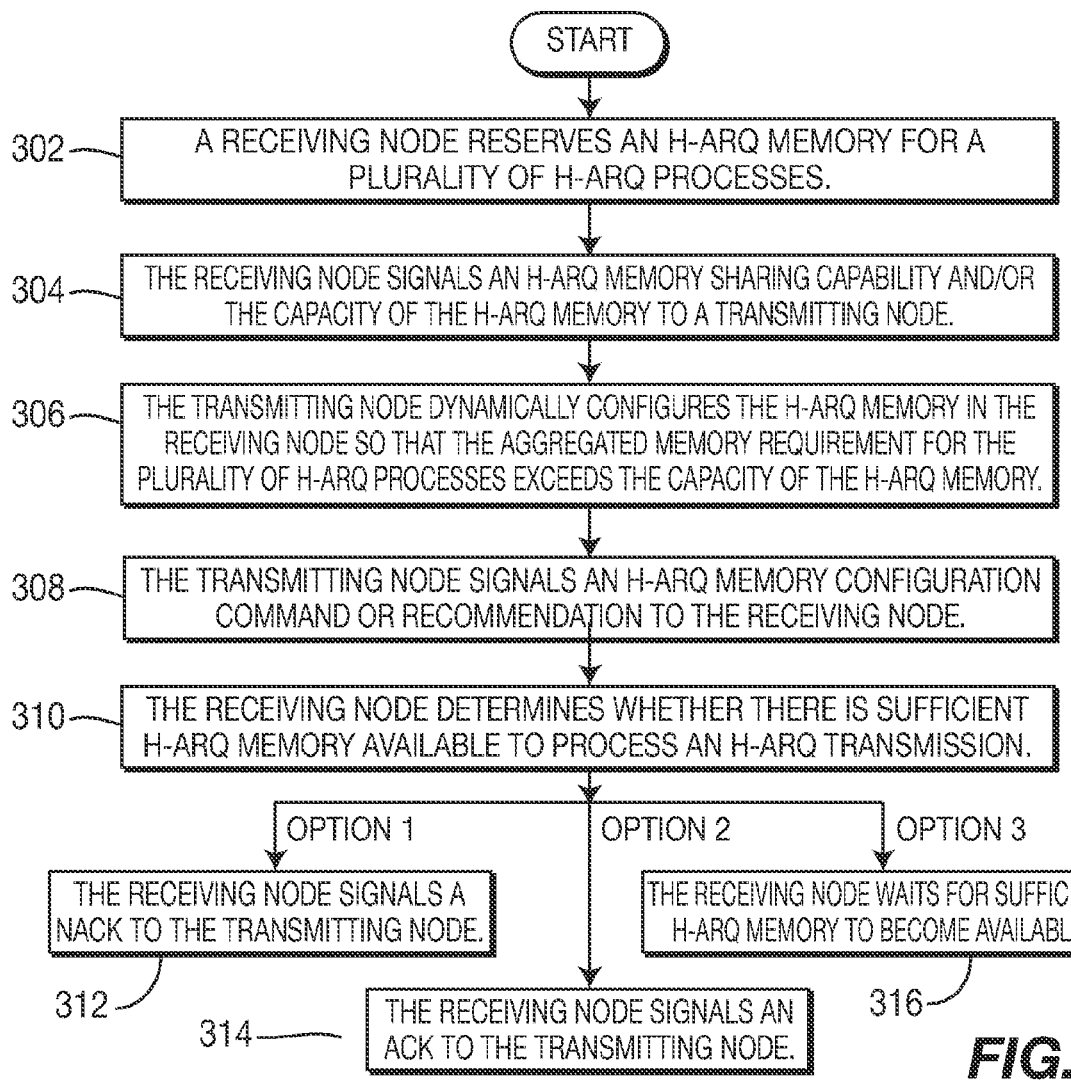

METHOD AND APPARATUS FOR DYNAMICALLY CONFIGURING A HYBRID AUTOMATIC REPEAT REQUEST MEMORY

CROSS REFERENCE TO RELATED APPLICATION

This application claims priority from U.S. Provisional Patent Application No. 60/843,145 filed Sep. 8, 2006 and U.S. Provisional Patent Application. No. 60/764,842 filed Feb. 3, 2006, which are incorporated by reference as if fully set forth.

FIELD OF INVENTION

The present invention is related to a wireless communication system including a transmitting node and a receiving node. More particularly, the present invention is related to a method for dynamically configuring a memory for hybrid automatic repeat request (H-ARQ) processes in a receiving node to permit a more flexible memory configuration and to improve the performance of H-ARQ processes.

BACKGROUND

Methods for improving data rates and the performance of wireless communication systems using H-ARQ processes are being investigated in the Third Generation Partnership Project (3GPP).

An H-ARQ scheme is used to generate transmissions and retransmissions with low latency. H-ARQ is a variation of an automatic repeat request (ARQ) error control method, which provides better performance than an ordinary ARQ method at the cost of increased implementation complexity. H-ARQ can be used in stop-and-wait retransmission or in selective repeat retransmission. Stop-and-wait retransmission is simpler to use. However, waiting for a receiver's acknowledgment of a signal reduces efficiency. Thus, multiple stop-and-wait H-ARQ processes are used in parallel to overcome the positive acknowledgement (ACK)/negative acknowledgement (NACK) round-trip delay due to this mechanism. Further, multiple H-ARQ processes allow high priority traffic to be sent immediately using a new H-ARQ process, rather than being stalled behind packets in transmission using an existing H-ARQ process. For example, when one H-ARQ process is waiting for an ACK, another H-ARQ process can be used to send more data.

In 3GPP, protocol messaging configures H-ARQ behavior, including H-ARQ memory availability. More specifically, the prior art permits protocol messages to configure an H-ARQ process with a buffer size and to exchange the buffer size with a communicating peer device, such as a WTRU or a Node-B. In the prior art, each H-ARQ process is configured with a particular H-ARQ memory limit. This configuration presents two limitations and inefficiencies. First, certain radio bearers may benefit from more H-ARQ processes, each with small memory requirements. Second, an application may benefit from fewer H-ARQ processes with larger buffer limits when the application has large memory requirements but can tolerate an increased number of H-ARQ retransmissions because the application does not have stringent delay requirements.

A challenge in implementing the H-ARQ mechanism is the receive memory requirement to buffer soft decoding decisions in the H-ARQ memory needed to implement incremental redundancy schemes.

Two of the desired improvements of long term evolution (LTE) of wideband code division multiple access (WCDMA) for universal mobile telecommunication systems (UMTS) are higher data rates as well as improved handling of different applications, particularly with different quality of service (QoS) requirements. LTE is also referred to as evolved universal terrestrial radio access (E-UTRA). To provide these desired improvements, LTE working groups are discussing flexible frame and transmission time interval (TTI) formats. Additionally, particular delay insensitive applications are able to tolerate a greater number of retransmissions.

As data rates increase, the amount of H-ARQ memory, (i.e. soft memory), needed for H-ARQ processes becomes a considerable cost factor for a baseband chipset. Therefore, H-ARQ memory optimizations are potentially a considerable design benefit. Unfortunately, the current H-ARQ memory allocation mechanism is too restrictive to handle these considerations. As a result, a new mechanism that permits for a more dynamic and flexible H-ARQ memory configuration is necessary.

SUMMARY

The present invention is related to a method for dynamically configuring a memory for hybrid automatic repeat request (H-ARQ) processes in a receiving node to permit a more flexible H-ARQ memory configuration and to improve the performance of H-ARQ processes. An H-ARQ memory in a receiving node is dynamically reserved for a plurality of H-ARQ processes. A transmitting node dynamically configures the H-ARQ memory in the receiving node for each new H-ARQ transmission. A receiving node signals a transmitting node during the establishment of an Radio Bearer utilizing H-ARQ transmission. The signaling informs a transmitting node of the capability to share an H-ARQ memory across a plurality of H-ARQ processes in a receiving node. The signaling informs a transmitting node of the capacity of an H-ARQ memory in a receiving node. An H-ARQ memory capacity is based on a maximum data rate and quality of service (QoS) requirement of a radio bearer. A transmitting node may dynamically configure the H-ARQ memory in a receiving node so that the memory requirement for a plurality of H-ARQ processes in aggregate exceeds the H-ARQ memory capacity of the receiving node. A transmitting node signals a receiving node instructing the receiving node to dynamically configure its H-ARQ memory accordingly.

If there is insufficient H-ARQ memory available at a receiving node to support H-ARQ transmission, only a subset of a plurality of H-ARQ processes may be activated at one time. When there is insufficient H-ARQ memory for processing a received H-ARQ transmission, a receiving node may signal a NACK, (with or without additional information indicating the insufficiency of the H-ARQ memory), an ACK, nothing, and/or information indicating the reason for the failed transmission may be transmitted to a transmitting node.

BRIEF DESCRIPTION OF THE DRAWINGS

A more detailed understanding of the invention may be had from the following description of a preferred embodiment, given by way of example and to be understood in conjunction with the accompanying drawings wherein:

FIG. 2 is a flow diagram of a dynamically configured H-ARQ memory allocation process implemented by the system of FIG. 1; and FIG. 3 is a flow diagram of a dynamically configured H-ARQ memory configuration process implemented by the system of FIG. 1 when the aggregated memory requirement for a set of H-ARQ processes exceeds H-ARQ memory capacity at a receiving node.

DETAILED DESCRIPTION OF THE PREFERRED EMBODIMENTS

Figure 1:
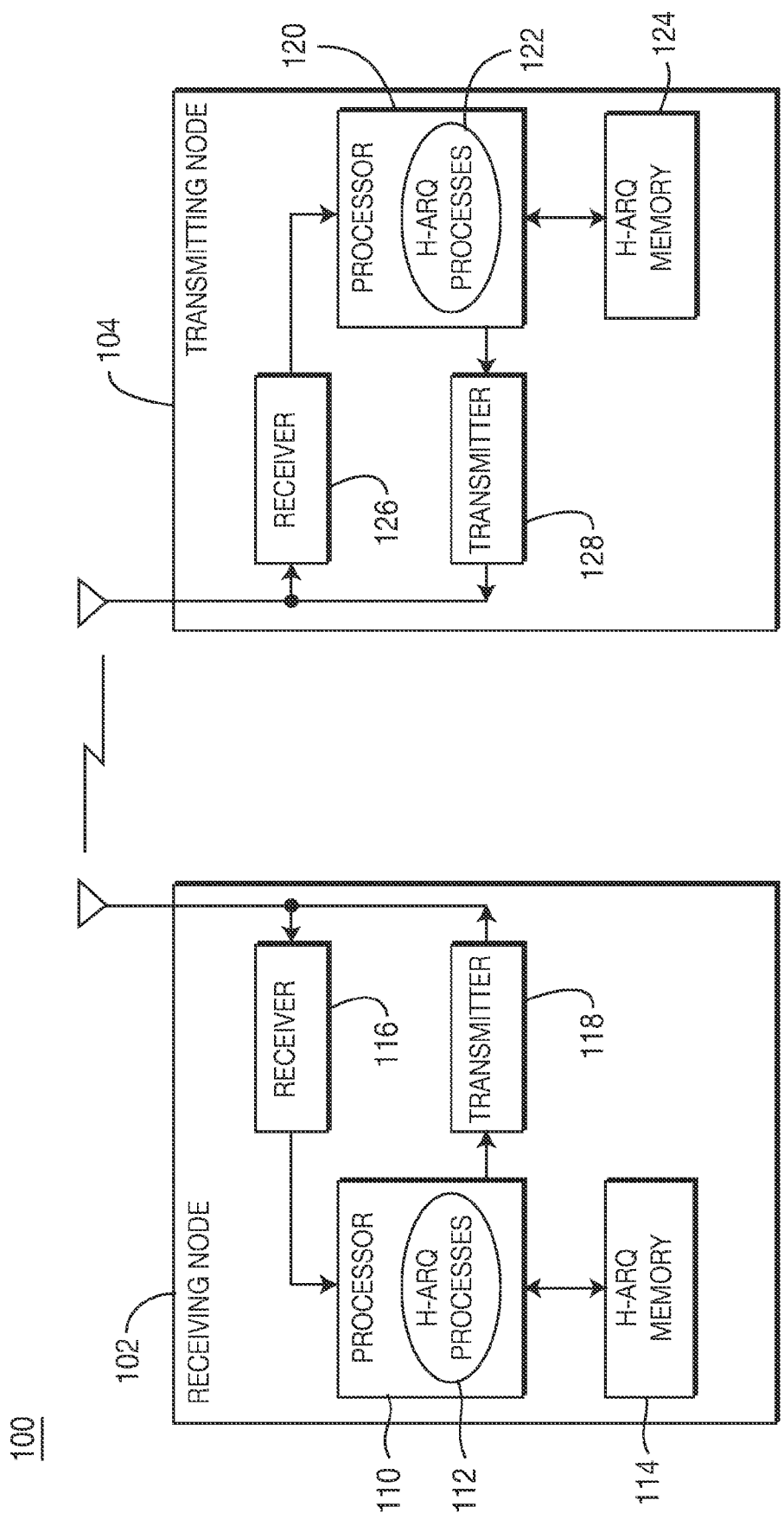
FIG. 1 is a block diagram of a wireless communication system configured in accordance with the present invention.

Hereafter, the terminology "wireless transmit/receive unit (WTRU)" includes but is not limited to a user equipment (UE), a mobile station, a fixed or mobile subscriber unit, a pager, or any other type of user device capable of operating in a wireless environment. When referred to hereafter, the terminology "base station" includes but is not limited to a Node-B, a site controller, an access point (AP) or any other type of interfacing device capable of operating in a wireless environment.

The features of the present invention may be incorporated into an integrated circuit (IC) or be configured in a circuit comprising a multitude of interconnecting components.

FIG. 1 is a block diagram of a wireless communication system 100 configured in accordance with the present invention. The system 100 includes a receiving node 102 and a transmitting node 104 configured for H-ARQ transmissions. The receiving node 102 and the transmitting node 104 communicate via explicit signaling or implicit signaling using existing parameters. With respect to downlink H-ARQ transmissions, the receiving node 102 may be a WTRU and the transmitting node 104 may be a Node-B. With respect to uplink H-ARQ transmissions, the receiving node 102 may be a Node-B and the transmitting node may be a WTRU.

As shown in FIG. 1, the receiving node 102 includes a processor 110, an H-ARQ memory 114, a receiver 116, and a transmitter 118. The processor 110 is configured to dynamically configure the allocation of H-ARQ memory 114 in accordance with signals received from the transmitting node 104. The processor 110 is configured to control a plurality of receiving H-ARQ processes 112.

In an alternative embodiment, the processor 110 may be configured to dynamically configure the allocation of the H-ARQ memory 114 without receiving any signals from the transmitting node 104. The processor 110 determines a configuration of the H-ARQ memory 114 by itself and signals the determined H-ARQ memory 114 configuration to the transmitting node 104 via the transmitter 118.

The H-ARQ memory 114 is reserved for a plurality receiving H-ARQ processes 112. The H-ARQ memory 114 may be referred to as soft memory. Preferably, the H-ARQ memory 114 is dynamically shared across a plurality of H-ARQ processes 112. The H-ARQ memory 114 is dynamically allocated among H-ARQ processes 112. When the aggregated soft memory requirement for the plurality of H-ARQ processes 112 exceeds the capacity of the H-ARQ memory 114, only certain subsets of the plurality of H-ARQ processes 112 may be active at any given time. Further, the amount of configured H-ARQ 114 memory may depend on a maximum data rate and/or QoS requirements of the radio bearer or MAC flow.

The receiver 116 of the receiving node 102 is configured to receive signals from the transmitting node 104 that instruct the receiving node 102 to configure its H-ARQ memory 114 accordingly. The transmitter 118 of the receiving node 102 is configured to signal an H-ARQ memory sharing capability and/or the capacity of the H-ARQ memory 114 to the transmitting node 104. The H-ARQ memory sharing capability indicates whether the receiving node 102 can share its H-ARQ memory 114 across the H-ARQ processes 112. The signaling may be explicit or implicit in accordance with existing parameters.

Still referring to FIG. 1, the transmitting node 104 includes a processor 120, an H-ARQ memory 124, a receiver 126, and a transmitter 128. The processor 120 is configured to dynamically configure the H-ARQ memory 114 in the receiving node 102. This memory configuration includes partitioning the H-ARQ memory across the plurality of H-ARQ processes 112.

The processor 120 in the transmitting node 104 is configured to manage and configure the H-ARQ memory 114 in the receiving node 102. During a transport format (TF) selection process, the processor 120 is configured to measure the H-ARQ memory 114 used by radio bearers, or MAC flows, being serviced in a current transmission time interval (TTI) when determining a transport block (TB) size and a modulation and coding scheme (MCS). The TF selection process may also consider the total data available to transmit, beyond the current TTI, and to reserve capacity in the H-ARQ memory 114 for subsequent TTIs to permit continuous, or almost continuous, transmission during the TTI for the currently selected TF transmission. The result is that the TB is sized to match the dynamically configurable H-ARQ memory 114 resources. Consequently, the dynamic configuration of the H-ARQ memory 114 in the receiving node 102 improves the performance of the H-ARQ processes 112 and the radio bearers and MAC flows mapped to the HARQ processes. The processor 120 is also configured to process a plurality of transmitting H-ARQ processes 122.

The transmitter 128 of the transmitting node 104 is configured to signal an H-ARQ memory configuration command or recommendation to the receiving node 102. As an example, with respect to downlink transmissions, the transmitter sends a command that the receiving node 102 must follow. As another example, with respect to uplink transmissions, the transmitter sends a recommendation that the receiving node 102 may follow. The transmitter 128 signals the receiving node 102 via explicit or implicit signaling using existing parameters. A transport format combination indicator (TFCI), a transport format resource indicator (TFRI), or other transmission associated signaling may be used to implicitly signal the H-ARQ memory requirement for each H-ARQ process to the receiving node 102. Further, knowledge of an H-ARQ process identity (ID) may be used to implicitly identify the H-ARQ memory requirement for an H-ARQ process 112. This information can be used to implicitly signal the H-ARQ memory 114 configuration to the receiving node 102. Alternatively, the transmitter 128 may explicitly signal the amount of H-ARQ memory 124 in the transmitting node 104 that has been allocated to the receiving node 102 With these mechanisms HARQ process memory partitioning may be coordinated between the transmitter and receiver each TTI a new HARQ process transmission is initiated.

Another method of implicit identification of the HARQ memory requirement is when the scheduler identifies a specific TF or subset of allowed TF's that may be utilized by the transmitter. Then, the receiver HARQ memory 114 is partitioned based on the scheduling information.

FIG. 2 is a flow diagram of a dynamically configured H-ARQ memory allocation process 200 implemented by the system 100 of FIG. 1. In step 202, the receiving node 102 reserves an H-ARQ memory 114 for a plurality of H-ARQ processes 112. In step 204, the receiving node 102 signals an H-ARQ memory sharing capability and/or the capacity of the H-ARQ memory 114 to the transmitting node 104. Note that step 204 may only be needed when the receiver is a WTRU.

The signaling indicates to the transmitting node 104 whether the receiving node 102 is capable of sharing the H-ARQ memory 114 across the plurality of H-ARQ processes 112. The signaling may also indicate the capacity of the H-ARQ memory 114 in the receiving node 102. The signaling may be explicit or implicit in accordance with existing parameters.

In step 206, the transmitting node 104 dynamically configures (partitions) the H-ARQ memory 114 in the receiving node 102 for H-ARQ processes 112 to improve the performance of H-ARQ processes 112. In step 208, the transmitting node 104 signals an H-ARQ memory configuration command or recommendation potentially in each new HARQ transmission to the receiving node 102. The signaling for partitioning of HARQ memory may be explicit or implicit. Preferably, the transmitting node uses fast physical layer signaling to configure and reconfigure the soft memory partitions between the H-ARQ processes 112 in the H-ARQ memory 114. The transmitting node 104 may also use Layer 2 MAC or Layer 3 radio resource control (RRC) signaling to configure and reconfigure the soft memory partitions between the H-ARQ processes 112 in the H-ARQ memory 114. As an optional embodiment, the association of H-ARQ processes 112 with specific radio bearers may be reconfigured through MAC or RRC signaling. The signaling is invoked upon establishment, release, or reconfiguration of the radio bearers. Consequently, the H-ARQ memory 114 in the receiving node 102 is dynamically configured to permit the improved performance of H-ARQ processes 112 at any potential time a new HARQ process transmission is initiated. It should be noted that after steps 202 and 204, steps 206 and 208 may repeat each TTI a new HARQ process transmission is initiated.

FIG. 3 is a flow diagram of a dynamically configured H-ARQ memory allocation process 300 implemented by the system 100 of FIG. 1 when the aggregated H-ARQ memory requirement for a set of H-ARQ processes 112 exceeds the H-ARQ memory 114 at the receiving node 102.

In step 302, the receiving node 102 reserves an H-ARQ memory 114 for a plurality of H-ARQ processes 112. The H-ARQ memory 114 capacity may be changed by the receiving node 102. In step 304, the receiving node 102 signals an H-ARQ memory sharing capability and/or the capacity of the H-ARQ memory 114 to the transmitting node 104. The signaling indicates to the transmitting node 104 whether the receiving node 102 is capable of sharing the H-ARQ memory 114 across the plurality of H-ARQ processes 112. The signaling may also indicate the capacity of the H-ARQ memory 114 in the receiving node 102. The signaling may be explicit or implicit in accordance with existing parameters.

In step 306, the transmitting node 104 dynamically configures the H-ARQ memory 114 in the receiving node 102 so that the aggregated memory requirement for the plurality of H-ARQ processes 112 exceeds the capacity of the H-ARQ memory 114. In step 308, the transmitting node 104 signals an H-ARQ memory configuration command or recommendation potentially in each new HARQ transmission to the receiving node 102.

In step 310, the receiving node 102 determines whether there is sufficient H-ARQ memory 114 available to support an H-ARQ transmission. If there is insufficient H-ARQ memory 114 to support an H-ARQ transmission and support soft combining, one of the following three options 312, 314, and 316 may be implemented for an failed H-ARQ transmissions.

In step 312 (option 1), the receiving node 102 signals a NACK to the transmitting node 104. The NACK informs the transmitting node 104 that the H-ARQ transmission has not been received correctly.

In step 314 (option 2), the receiving node 102 signals an ACK to the transmitting node 104. The ACK falsely indicates that the receiving node 102 has received an H-ARQ transmission when the receive node 102 does not want the transmit node 104 to retransmit the H-ARQ transmission. This procedure exists to prevent H-ARQ retransmission when there is insufficient H-ARQ memory 114 available. This scenario assumes that it is not possible for the receiving node 102 to inform the transmit node 104 that no H-ARQ memory 114 is available. This is beneficial in H-ARQ schemes where H-ARQ retransmissions are not self-decodable. If a separate ARQ scheme exists to correct residual H-ARQ transmission errors, the ARQ scheme could recover the transmission.

In step 316 (option 3), the receiving node 102 waits for sufficient H-ARQ memory 114 to become available to support an H-ARQ transmission. The receiver node 102 signals nothing back to the transmitting node 104.

In an alternative embodiment, the receiving node 102 may signal additional information indicating the reason for the failure to support the H-ARQ transmission. For example, the failure was due to a shortage of H-ARQ memory 114. This additional information may be signaled along with the ACK/NACK signaling described above. Further, the additional information may be signaled in place of the ACK/NACK signaling.

As an informative example, suppose that an H-ARQ memory 114 in a receiving node 102 has a one (1) Mb capacity and supports four identically configured H-ARQ processes. This process 300 permits a fifth H-ARQ process to be instantiated so that the H-ARQ memory 114 is not guaranteed to be sufficient for the H-ARQ processes 112. The H-ARQ memory 114 may contain soft memory partitions that are preconfigured to support multiple H-ARQ processes 112. The dynamic configuration of H-ARQ processes 112 may ensure that the H-ARQ memory 114 capacity is not exceeded.

The features of the present invention may be incorporated into an integrated circuit (IC) or be configured in a circuit comprising a multitude of interconnecting components.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic lightemitting diode (OLED) display unit, a digital music player, a media player, a video game player module, an Internet browser, and/or any wireless local area network (WLAN) module.

What is claimed is:

1. A method of dynamically configuring a hybrid automatic repeat request (H-ARQ) memory in a receiving node for a plurality of H-ARQ processes, the method comprising:
the receiving node reserving an H-ARQ memory for the plurality of H-ARQ processes;
the receiving node signaling at least one of an H-ARQ memory sharing capability or a H-ARQ memory capacity to a transmitting node; and
the receiving node receiving a memory configuration indication from the transmitting node based on the H-ARQ memory sharing capability and H-ARQ memory capacity for dynamically configuring the H-ARQ memory for at least each new H-ARQ transmission;
the receiving node, transmitting a false ACK to the transmitting node when there is insufficient H-ARQ memory to prevent the transmitting node from sending a H-ARQ retransmission;
the receiving node utilizing an automatic repeat request (ARQ) scheme to recover a transmission lost due to the false ACK transmission; and
the receiving node is unable to inform the transmitting mode that there is insufficient H-ARQ memory.

2. The method of claim 1 wherein the receiving node is a wireless transmit/receive unit (WTRU) and the transmitting node is a Node-B.

3. The method of claim 1 wherein the receiving node is a Node-B and the transmitting node is a wireless transmit/receive unit (WTRU).

4. The method of claim 1 wherein the memory configuration indication is a command.

5. The method of claim 1, wherein the memory configuration indication is signaled via at least one of implicit and explicit signaling.

6. The method of claim 5, wherein the memory configuration indication is signaled via one of a transport format combination indicator, a transport format resource indicator or scheduling information.

7. The method of claim 1, wherein the memory configuration indication is signaled via one of a transport format combination indicator, a transport format resource indicator or scheduling information.

8. A method of dynamically configuring a hybrid automatic repeat request (H-ARQ) memo 1 T for a plurality of H-ARQ processes that exceed the H-ARQ memory capacity in the receiving node, the method comprising:
the receiving node reserving an H-ARQ memory for the plurality- of H-ARQ processes;
the receiving node signaling at least one of an H-ARQ memory sharing capability or a H-ARQ memory capacity to a transmitting node;
the receiving node receiving a memory configuration indication from the transmitting node based on the signaled H-ARQ memory sharing capability and HARQ memory capacity for dynamically configuring the H-ARQ memory for at least each new H-ARQ transmission;
the receiving node determining whether there is sufficient H-ARQ memory to support an H-ARQ transmission signaled from the transmitting node;
the receiving node, transmitting a false ACK to the transmitting node when there is insufficient H-ARQ memory to prevent the transmitting node from sending an H-ARQ retransmission;
the receiving node utilizing an automatic repeat request (ARQ) scheme to recover a transmission lost due to the false ACK transmission; and
the receiving node is unable to inform the transmitting mode that there is insufficient H-ARQ memory.

9. The method of claim 8 further comprising the receiving node signaling a negative acknowledgement (NACK) to the transmitting node for a failed H-ARQ transmission.

10. The method of claim 8 further comprising the receiving node signaling an acknowledgement (ACK) to the transmitting node for a failed HARQ transmission.

11. The method of claim 8 further comprising the receiving node waiting for sufficient H-ARQ memory to become available to support an HARQ transmission.

12. The method of claim 8 wherein the receiving node is a wireless transmit/receive unit (WTRU) and the transmitting node is a Node-B.

13. The method of claim 8 wherein the receiving node is a Node-B and the transmitting node is a wireless transmit/receive unit (WTRU), 14. The method of claim 8 wherein the memory configuration indication is a command.

15. The method of claim 8 wherein the memory configuration indication is a recommendation.

16. A wireless transmit/receive unit (WTRU), the WTRU comprising:
a transmitter configured to transmit a hybrid automatic repeat request (HARQ) memory sharing capability and a H-ARQ memory capacity to a Node-B;
a receiver configured to receive a memory configuration indication from the Node-B based on the transmitted H-ARQ memory sharing capability and H-ARQ memory capacity;
an H-ARQ memory configured for storing a plurality of H-ARQ processes;
a processor configured to dynamically configure the allocation of the H-ARQ memory for at least each new H-ARQ transmission based on the memory configuration indication received from the Node-B;
and the processor is configured to respond with a false ACK when there is insufficient H-ARQ memory to prevent the Node-B from sending an H-ARQ retransmission, and utilize an automatic repeat request (ARQ) scheme to recover a transmission lost due to the false ACK transmission; and
the receiving node is unable to inform the transmitting mode that there is insufficient H-ARQ memory.

17. The WTRU according to claim 16 wherein the memory configuration indication is a command.

18. The WTRU according to claim 16 wherein the processor is further configured to determine whether there is sufficient H-ARQ memory to support a H-ARQ transmission signaled from the Node-B.

19. The WTRU according to claim 18 wherein the transmitter is further configured to transmit a negative acknowledgement (NACK) to the Node-B for a failed H-ARQ transmission.

20. The WTRU according to claim 18 wherein the transmitter is further configured to transmit an acknowledgement (ACK) to the Node-B for a failed H-ARQ transmission.

* * * * *